(12) United States Patent
Na et al.

(10) Patent No.: US 8,618,191 B2
(45) Date of Patent: Dec. 31, 2013

(54) ACRYLIC BASED RESIN COMPOSITION AND MOLDED PRODUCT USING THE SAME

(75) Inventors: Hee-Seok Na, Uiwang-si (KR); Doo-Han Ha, Uiwang-si (KR); Young-Sin Kim, Uiwang-si (KR); Ji-Eun Park, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 216 days.

(21) Appl. No.: 13/238,667

(22) Filed: Sep. 21, 2011

(65) Prior Publication Data

US 2012/0172499 A1 Jul. 5, 2012

(30) Foreign Application Priority Data

Dec. 31, 2010 (KR) ........................ 10-2010-0140558

(51) Int. Cl.
*C08L 83/00* (2006.01)
*C03C 25/26* (2006.01)

(52) U.S. Cl.
USPC ............ 523/201; 524/203; 524/494; 524/504

(58) Field of Classification Search
USPC ............ 428/412; 525/66; 524/203, 494, 504; 523/201
See application file for complete search history.

(56) References Cited

U.S. PATENT DOCUMENTS

| | | | |
|---|---|---|---|
| 4,173,600 A * | 11/1979 | Kishida et al. | .................. 525/76 |
| 5,773,520 A | 6/1998 | Bertelo et al. | |
| 5,840,803 A | 11/1998 | Chang et al. | |
| 5,973,081 A * | 10/1999 | Kanai et al. | .................. 525/398 |
| 7,345,112 B2 | 3/2008 | You et al. | |
| 7,514,502 B2 | 4/2009 | Kim et al. | |
| 8,367,770 B2 | 2/2013 | Ha et al. | |
| 2007/0287799 A1 | 12/2007 | Ha et al. | |
| 2008/0051508 A1 | 2/2008 | Hayata et al. | |
| 2009/0018237 A1 | 1/2009 | Fujii et al. | |
| 2009/0018268 A1 | 1/2009 | Sakurai | |
| 2009/0093572 A1* | 4/2009 | Gugumus | ........................ 524/95 |
| 2010/0168332 A1* | 7/2010 | Chung et al. | .................... 525/71 |

FOREIGN PATENT DOCUMENTS

| | | |
|---|---|---|
| CN | 101768344 | 7/2010 |
| EP | 1911807 A1 | 4/2008 |
| JP | 10-237265 | 9/1998 |
| JP | 11-116767 A | 4/1999 |
| JP | 11-279380 | 10/1999 |
| JP | 2004-285258 | 10/2004 |
| JP | 2005-171204 | 6/2005 |
| JP | 2005-200517 | 7/2005 |
| JP | 2005-220177 | 8/2005 |
| JP | 2005-336220 | 12/2005 |
| JP | 2005-344075 | 12/2005 |
| JP | 2006-070224 | 3/2006 |
| JP | 2006-137908 | 6/2006 |
| JP | 2006-161024 | 6/2006 |
| JP | 2007-186562 | 7/2007 |
| JP | 2007-269915 | 10/2007 |
| JP | 2008-007594 | 1/2008 |
| JP | 2008-050427 | 3/2008 |
| KR | 10-0277053 | 10/2000 |
| KR | 10-2003-0038366 A | 5/2003 |
| KR | 10-0515592 A | 12/2004 |
| KR | 10-2005-0064806 A | 6/2005 |
| KR | 10-2006-0035002 A | 4/2006 |
| KR | 10-2007-0047073 A | 5/2007 |
| KR | 10-2007-0104555 A | 10/2007 |
| KR | 10-2007-0117315 A | 12/2007 |
| KR | 10-0815995 A | 12/2007 |
| KR | 10-2008-0112842 A | 12/2008 |
| WO | 2005/123831 A1 | 12/2005 |

OTHER PUBLICATIONS

Office Action in commonly owned U.S. Appl. No. 12/649,471 mailed Aug. 17, 2011, pp. 1-12.
Search Report in counterpart Chinese Application No. 201110303074.9 dated Sep. 23, 2013, pp. 1-2.

* cited by examiner

*Primary Examiner* — Hannah Pak
(74) *Attorney, Agent, or Firm* — Additon, Higgins, Pendleton & Ashe, P.A.

(57) ABSTRACT

Disclosed are an acrylic-based resin composition including (A) a first acrylic-based copolymer having a core-shell structure including a rubber having an average particle diameter of about 0.1 to about 0.30 μm, (B) a second acrylic-based copolymer having a core-shell structure including a rubber having an average particle diameter of about 0.35 to about 0.6 μm, (C) a vinyl-based copolymer, (D) an ultraviolet (UV) stabilizer, and (E) an UV absorber; and a molded product made using the same.

10 Claims, No Drawings

ACRYLIC BASED RESIN COMPOSITION AND MOLDED PRODUCT USING THE SAME

CROSS-REFERENCE TO RELATED APPLICATIONS

This application claims priority under 35 USC Section 119 to and the benefit of Korean Patent Application No. 10-2010-0140558 filed in the Korean Intellectual Property Office on Dec. 31, 2010, the entire disclosure of which is incorporated herein by reference.

FIELD OF THE INVENTION

The present invention relates to an acrylic-based resin composition and a molded product using the same.

BACKGROUND

ASA (acrylonitrile-styrene-acrylate) resin can have excellent weather resistance, light resistance, chemical resistance, heat resistance and the like, and has been widely used for molded products such as electric and electronic devices, automobile exterior parts, construction materials and the like.

However, ASA resin can have limited application for various molded products due to its poor coloring properties, mechanical properties, and appearance characteristics.

ASA resin can include a copolymer of aromatic vinyl compound and vinyl cyanide compound grafted to a mixture of acrylic-based rubber latex having a large particle size and acrylic-based rubber latex having a small particle size. This resin, however, can exhibit only limited improvements in coloring properties.

In addition, ASA resin can be mixed with an impact-reinforcing agent. This resin composition, however, can exhibit only limited improvements in weather resistance and coloring properties.

SUMMARY

One embodiment of the present invention provides an acrylic-based resin composition that can have excellent coloring properties, impact resistance, weather resistance and/or a high glossy appearance.

Another embodiment of the present invention provides a molded product made using the acrylic-based resin composition.

According to one embodiment of the present invention, an acrylic-based resin composition is provided that includes (A) a first acrylic-based copolymer having a core-shell structure including a rubber having an average particle diameter of about 0.1 to about 0.30 µm; (B) a second acrylic-based copolymer having a core-shell structure including a rubber having an average particle diameter of about 0.35 to about 0.6 µm; (C) a vinyl-based copolymer; (D) an ultraviolet (UV) stabilizer; and (E) an UV absorber.

The acrylic-based resin composition may include about 4 to about 48 wt % of the first acrylic-based copolymer (A); about 4 to about 48 wt % of the second acrylic-based copolymer (B); about 40 to about 80 wt % of the vinyl-based copolymer (C); about 0.1 to about 1.2 parts by weight of the ultraviolet (UV) stabilizer (D) based on 100 parts by weight of the (A), (B) and (C) components; and about 0.1 to about 1.2 parts by weight of the UV absorber (E) based on 100 parts by weight of the (A), (B) and (C) components.

The rubber included in the first acrylic-based copolymer (A) may have a bilayer structure including an inner layer including a copolymer of acrylic-based compound and an aromatic vinyl compound and an outer layer including an acrylic-based compound.

The rubber included in the second acrylic-based copolymer (B) may have a bilayer structure including an inner layer including polyalkyl(meth)acrylate and an outer layer including acrylic-based compound.

The first acrylic-based copolymer (A) and the second acrylic-based copolymer (B) are included in a weight ratio of about 2:8 to about 8:2.

The vinyl-based copolymer (C) may include a copolymer of an aromatic vinyl compound and a vinyl cyanide compound.

The ultraviolet (UV) stabilizer (D) may include a hindered amine-based compound, for example, bis(2,2,6,6-tetramethyl-4-piperidyl)sebacate, tetrakis(2,2,6,6-tetramethyl-4-piperidyl)-1,2,3,4-butanetetracarboxylate, 2,4-dichloro-6-(1,1,3,3-tetramethylbutylamino)-1,3,5-triazine, N,N'-bis(2,2,6,6-tetramethyl-4-piperidyl)hexamethylenediamine, a polycondensate thereof, or a combination thereof.

The UV absorber (E) may include a benzotriazole-based compound, for example, 2-(2-hydroxy-5-methylphenyl)-2H-benzotriazole, hydroxy-3,5-di (1,1-dimethylbenzyl)phenyl-2H-benzotriazole, phenol-2-(5-chloro-2H-benzotriazole)-4,6-bis (1,1-dimethylethyl), phenol-1,2-(2H-benzotriazol-2-yl)-4-methyl-6-dodecyl, or a combination thereof.

The ultraviolet (UV) stabilizer (D) and the UV absorber (E) may be included in a weight ratio of about 1:9 to about 9:1.

Another aspect of the present invention provides a molded product made using the acrylic-based resin composition.

Hereinafter, further embodiments of the present invention will be described in detail.

The acrylic-based resin composition can have excellent coloring properties, impact resistance, weather resistance, and high gloss, so it may be used in various molded products, including plastic exterior products such as electronic parts, automobile parts and the like.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "(meth)acrylate" may refer to "acrylate" and "methacrylate". The term "(meth)acrylic acid alkyl ester" may refer to "acrylic acid alkyl ester" and "methacrylic acid alkyl ester" and, and the term "(meth)acrylic acid ester" may refer to "acrylic acid ester" and "methacrylic acid ester".

As used herein, when a specific definition is not otherwise provided, the term "substituted" may refer to one substituted with halogen (F, Cl, Br, I), hydroxy, C1 to C20 alkoxy, nitro, cyano, amino ($NH_2$, $NH(R^{100})$ or $N(R^{101})(R^{102})$, wherein $R^{100}$, $R^{101}$, and $R^{102}$ are the same or different and are each independently C1 to C10 alkyl), imino, azido, amidino, hydrazino, hydrazono, carbonyl, carbamyl, thiol, ester, ether, carboxyl or a salt thereof, sulfonic acid or a salt thereof, phosphoric acid or a salt thereof, C1 to C20 alkyl, C2 to C20 alkenyl, C2 to C20 alkynyl, C6 to C30 aryl, C3 to C20 cycloalkyl, C3 to C20 cycloalkenyl, C3 to C20 cycloalkynyl, C2 to C20 heterocycloalkyl, C2 to C20 heterocycloalkenyl, C2 to C20 heterocycloalkynyl, C3 to C30 heteroaryl, or combination thereof, in place of at least one hydrogen.

As used herein, when a specific definition is not otherwise provided, the term "hetero" may refer to one including at least one heteroatom of N, O, S, P, or a combination thereof in place of a carbon ring atom.

The acrylic-based resin composition may include (A) a first acrylic-based copolymer having a core-shell structure including a rubber having an average particle diameter of about 0.1 to about 0.30 μm, (B) a second acrylic-based copolymer having a core-shell structure including a rubber having an average particle diameter of about 0.35 to about 0.6 μm, (C) a vinyl-based copolymer, (D) an ultraviolet (UV) stabilizer, and (E) an UV absorber.

Exemplary components included in the acrylic-based resin composition according to embodiments of the present invention will hereinafter be described in detail.

(A) First Acrylic-Based Copolymer Having Core-Shell Structure

The first acrylic-based copolymer may have a core-shell structure that includes a shell grafted to a core of rubber.

The rubber may have an average particle diameter of about 0.1 to about 0.30 μm, for example an average particle diameter of about 0.1 to about 0.2 μm.

In some embodiments, the rubber may have an average particle diameter of about 0.1, 0.2, or 0.30 μm. Further, according to some embodiments of the present invention, the rubber may have an average particle diameter in a range from about any of the foregoing amounts to about any other of the foregoing amounts. When the first acrylic-based copolymer includes a rubber having an average particle diameter within the above range, it may improve the coloring property of the acrylic-based resin composition and can provide a high gloss.

The rubber may have a bilayer structure including an inner layer and an outer layer.

The inner layer may include a copolymer of acrylic-based compound and aromatic vinyl compound, and the outer layer may include an acrylic-based compound.

Exemplary acrylic-based compounds for the inner layer and the outer layer may include without limitation (meth) acrylic acid alkyl esters, (meth)acrylic acid, and the like, and combinations thereof. The alkyl may be C1 to C10 alkyl. Examples of the (meth)acrylic acid alkyl esters may include without limitation methyl(meth)acrylate, ethyl(meth)acrylate, butyl(meth)acrylate and the like, and combinations thereof.

Exemplary aromatic vinyl compounds may include without limitation styrene, C1 to C10 alkyl-substituted styrene, halogen-substituted styrene, and the like, and combinations thereof. Examples of the alkyl-substituted styrene may include without limitation o-ethyl styrene, m-ethyl styrene, p-ethyl styrene, α-methyl styrene, and the like, and combinations thereof.

The rubber may include about 20 to about 80 wt % of the inner layer and about 20 to about 80 wt % of the outer layer, for example about 30 to about 70 wt % of the inner layer and about 30 to about 70 wt % of the outer layer.

In some embodiments, the rubber of the first acrylic-based copolymer can include the inner layer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80wt %. Further, according to some embodiments of the present invention, the amount of the inner layer can be in a range from about any of the foregoing amounts to about any other of the foregoing amounts.

In some embodiments, the rubber of the first acrylic-based copolymer can include the outer layer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80wt %. Further, according to some embodiments of the present invention, the amount of the outer layer can be in a range from about any of the foregoing amounts to about any other of the foregoing amounts.

When the rubber of the first acrylic-based copolymer has inner and outer layers in an amount within the above ratio range, it may improve the coloring property of the acrylic-based resin composition.

The shell grafted to the core of rubber may include an unsaturated compound.

Exemplary unsaturated compounds may include without limitation aromatic vinyl compounds, vinyl cyanide compounds, heterocyclic compounds, and the like, and combinations thereof.

In one embodiment, a mixture or a copolymer of an aromatic vinyl compound and a vinyl cyanide compound may be used. The aromatic vinyl compound and the vinyl cyanide compound may be included in an amount of about 50 to about 80 wt % and about 20 to about 50 wt %, respectively.

In some embodiments, the mixture or a copolymer of an aromatic vinyl compound and a vinyl cyanide compound can include the aromatic vinyl compound in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80wt %. Further, according to some embodiments of the present invention, the amount of the aromatic vinyl compound can be in a range from about any of the foregoing amounts to about any other of the foregoing amounts.

In some embodiments, the mixture or a copolymer of an aromatic vinyl compound and a vinyl cyanide compound can include the vinyl cyanide compound in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the vinyl cyanide compound can be in a range from about any of the foregoing amounts to about any other of the foregoing amounts.

Exemplary aromatic vinyl compounds may include without limitation styrene, C1 to C10 alkyl-substituted styrene, halogen-substituted styrene, and the like, and combinations thereof. Exemplary alkyl-substituted styrenes may include without limitation o-ethyl styrene, m-ethyl styrene, p-ethyl styrene, α-methyl styrene, and the like, and combinations thereof.

Exemplary vinyl cyanide compounds may include without limitation acrylonitrile, methacrylonitrile, ethacrylonitrile, and the like, and combinations thereof.

Exemplary heterocyclic compounds may include without limitation maleic anhydride, C1-C10 alkyl or phenyl N-substituted maleimide, and the like, and combinations thereof.

The first acrylic-based copolymer may include about 20 to about 80 wt % of the core of rubber and about 20 to about 80 wt % of the shell, for example about 30 to about 70 wt % of the core of rubber and about 30 to about 70 wt % of the shell.

In some embodiments, the first acrylic-based copolymer can include the rubber core in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80wt %. Further, according to some embodiments of the present invention, the amount of the rubber core can be in a range from about any of the foregoing amounts to about any other of the foregoing amounts.

In some embodiments, the first acrylic-based copolymer can include the shell in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80wt %. Further, according to some embodiments of the present invention, the amount of the shell can be in a range from about any of the foregoing amounts to about any other of the foregoing amounts.

When the first acrylic-based copolymer includes the shell and core in an amount within the above ratio range, the acrylic-based resin composition may have fewer deviations in its physical properties and also can have a good glossy appearance.

The first acrylic-based copolymer may be prepared by emulsion polymerization, suspension polymerization, solution polymerization, or bulk polymerization, for example, emulsion polymerization.

The acrylic-based resin composition may include the first acrylic-based copolymer in an amount of about 4 to about 48 wt %, for example about 6 to about 42 wt %, based on the total weight of the first acrylic-based copolymer (A), the second acrylic-based copolymer (B), and the vinyl-based copolymer (C).

In some embodiments, the acrylic-based resin composition can include the first acrylic-based copolymer in an amount of about 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, or 48wt %. Further, according to some embodiments of the present invention, the amount of the first acrylic-based copolymer can be in a range from about any of the foregoing amounts to about any other of the foregoing amounts.

When the first acrylic-based copolymer is included in an amount within the above range, it may provide an excellent balance of physical properties, coloring property, impact resistance, weather resistance, and high gloss.

(B) Second Acrylic-Based Copolymer Having Core-Shell Structure

The second acrylic-based copolymer may have a core-shell structure that includes a shell grafted to a core of a rubber.

The rubber may have an average particle diameter of about 0.35 to about 0.6 μm, for example an average particle diameter of about 0.35 to about 0.5 μm. In some embodiments, the rubber may have an average particle diameter of about 0.35, 0.36. 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, or 0.6 μm. Further, according to some embodiments of the present invention, the rubber may have an average particle diameter in a range from about any of the foregoing amounts to about any other of the foregoing amounts.

When the second acrylic-based copolymer includes a rubber having an average particle diameter within the above range, it may improve the impact resistance of the acrylic-based resin composition.

The rubber may have a bilayer structure including an inner layer and an outer layer.

The inner layer may include polyalkyl(meth)acrylate, and the outer layer may include acrylic-based compound. The second acrylic-based copolymer includes polyalkyl(meth)acrylate in the inner layer of rubber, so it may improve the impact resistance of acrylic-based resin composition.

The polyalkyl(meth)acrylate may be a homopolymer including alkyl(meth)acrylate as a main component or a copolymer of alkylacrylate and alkylmethacrylate. The alkyl may be a substituted or unsubstituted C1 to C10 alkyl. Exemplary alkyl(meth)acrylates may include without limitation methyl(meth)acrylate, ethyl(meth)acrylate, butyl(meth)acrylate, hydroxyethyl(meth)acrylate, and the like, and combinations thereof.

Exemplary acrylic-based compounds may include without limitation (meth)acrylic acid alkyl esters, (meth)acrylic acid, and the like, and combinations thereof. The alkyl may be C1 to C10 alkyl. Examples of (meth)acrylic acid alkyl ester may include without limitation methyl(meth)acrylate, ethyl(meth) acrylate, butyl(meth)acrylate and the like, and combinations thereof. The rubber of the second acrylic-based copolymer may include about 20 to about 80 wt % of the inner layer and about 20 to about 80 wt % of the outer layer, for example about 30 to about 70 wt % of the inner layer and about 30 to about 70 wt % of the outer layer.

In some embodiments, the rubber of the second acrylic-based copolymer can include the inner layer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80wt %. Further, according to some embodiments of the present invention, the amount of the inner layer can be in a range from about any of the foregoing amounts to about any other of the foregoing amounts.

In some embodiments, the rubber of the second acrylic-based copolymer can include the outer layer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the outer layer can be in a range from about any of the foregoing amounts to about any other of the foregoing amounts.

When the rubber includes the inner and outer layers in an amount within the above ratio range, it may improve the impact resistance of the acrylic-based resin composition.

The shell grafted to the cell of rubber may include an unsaturated compound.

Exemplary unsaturated compounds may include without limitation aromatic vinyl compounds, vinyl cyanide compounds, heterocyclic compounds, and the like, and combinations thereof, for example, a mixture or a copolymer of aromatic vinyl compound and vinyl cyanide compound. The aromatic vinyl compound and the vinyl cyanide compound may be included in an amount of about 50 to about 80 wt % and about 20 to about 50 wt %, respectively.

In some embodiments, the mixture or a copolymer of an aromatic vinyl compound and a vinyl cyanide compound can include the aromatic vinyl compound in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the aromatic vinyl compound can be in a range from about any of the foregoing amounts to about any other of the foregoing amounts.

In some embodiments, the mixture or a copolymer of an aromatic vinyl compound and a vinyl cyanide compound can include the vinyl cyanide compound in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50wt %. Further, according to some embodiments of the present invention, the amount of the vinyl cyanide compound can be in a range from about any of the foregoing amounts to about any other of the foregoing amounts.

Exemplary aromatic vinyl compounds may include without limitation styrene, C1 to C10 alkyl-substituted styrene, halogen-substituted styrene, and the like, and combinations thereof. Examples of the alkyl-substituted styrenes may include without limitation o-ethyl styrene, m-ethyl styrene, p-ethyl styrene, α-methyl styrene, and the like, and combinations thereof.

Exemplary vinyl cyanide compounds may include without limitation acrylonitrile, methacrylonitrile, ethacrylonitrile, and the like, and combinations thereof.

Exemplary heterocyclic compounds may include without limitation maleic anhydride, C1 to C10 alkyl or phenyl N-substituted maleimide, and the like, and combinations thereof.

The second acrylic-based copolymer may include about 20 to about 80 wt % of the core of rubber and about 20 to about 80 wt % of the shell, for example about 30 to about 70 wt % of a core of rubber and about 30 to about 70 wt % of the shell.

In some embodiments, the second acrylic-based copolymer can include the rubber core in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80wt %. Further, according to some embodiments of the present invention, the amount of the rubber core can be in a range from about any of the foregoing amounts to about any other of the foregoing amounts.

In some embodiments, the second acrylic-based copolymer can include the shell in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the shell can be in a range from about any of the foregoing amounts to about any other of the foregoing amounts.

When the second acrylic-based copolymer includes the core and shell in an amount within the above ratio range, the acrylic-based resin composition may have fewer deviations in its physical properties and may also have a good glossy appearance.

The second acrylic-based copolymer may be prepared by emulsion polymerization, suspension polymerization, solution polymerization or bulk polymerization, for example, emulsion polymerization.

The acrylic-based resin composition may include the second acrylic-based copolymer in an amount of about 4 to about 48 wt %, for example about 6 to about 42 wt %, based on the total weight of the first acrylic-based copolymer (A), the second acrylic-based copolymer (B), and the vinyl-based copolymer (C).

In some embodiments, the acrylic-based resin composition can include the second acrylic-based copolymer in an amount of about 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, or 48 wt %. Further, according to some embodiments of the present invention, the amount of the second acrylic-based copolymer can be in a range from about any of the foregoing amounts to about any other of the foregoing amounts.

When the second acrylic-based copolymer is included in an amount within the above range, it may provide an excellent balance of physical properties, coloring property, impact resistance, and weather resistance.

The first acrylic-based copolymer (A) and the second acrylic-based copolymer (B) may be mixed in a weight ratio of about 2:8 to about 8:2, for example in a weight ratio of about 3:7 to about 7:3.

In some embodiments, the first acrylic-based copolymer and the second acrylic-based copolymer can include the first acrylic-based copolymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the first acrylic-based copolymer can be in a range from about any of the foregoing amounts to about any other of the foregoing amounts.

In some embodiments, the first acrylic-based copolymer and the second acrylic-based copolymer can include the second acrylic-based copolymer in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the second acrylic-based copolymer can be in a range from about any of the foregoing amounts to about any other of the foregoing amounts.

When the first acrylic-based copolymer (A) and the second acrylic-based copolymer (B) are included in a weight ratio within the above range, the acrylic-based resin composition may exhibit an excellent balance of physical properties, coloring property, impact resistance, weather resistance, and high gloss.

(C) Vinyl-Based Copolymer

The vinyl-based copolymer may include a copolymer of aromatic vinyl compound and vinyl cyanide compound.

The vinyl-based copolymer may be produced as a side product during the preparation of the first and the second acrylic-based copolymers.

Exemplary aromatic vinyl compounds may include without limitation styrene, C1 to C10 alkyl-substituted styrene, halogen-substituted styrene, vinyl toluene, vinyl naphthalene, and the like, and combinations thereof. Examples of the alkyl-substituted styrenes may include without limitation α-methyl styrene, p-methyl styrene, o-ethyl styrene, m-ethyl styrene, p-ethyl styrene, p-t-butylstyrene, 2,4-dimethylstyrene, and the like, and combinations thereof.

Exemplary vinyl cyanide compounds may include without limitation acrylonitrile, methacrylonitrile, ethacrylonitrile, and the like, and combinations thereof.

Exemplary vinyl-based copolymers may include without limitation a copolymer of styrene and acrylonitrile; a copolymer of α-methylstyrene and acrylonitrile; a copolymer of styrene, α-methylstyrene, and acrylonitrile; and the like, and combinations thereof. In one embodiment, the vinyl-based copolymer can include a copolymer of styrene and acrylonitrile.

The vinyl-based copolymer may be prepared by emulsion polymerization, suspension polymerization, solution polymerization, or bulk polymerization, and it may have a weight average molecular weight of about 15,000 to about 400,000 g/mol.

The copolymer of aromatic vinyl compound and vinyl cyanide compound may be a copolymer prepared by polymerizing about 50 to about 80 wt % of the aromatic vinyl compound and about 20 to about 50 wt % of the vinyl cyanide compound, for example a copolymer prepared by polymerizing about 60 to about 80 wt % of the aromatic vinyl compound and about 20 to about 40 wt % of the vinyl cyanide compound.

In some embodiments, the copolymer of aromatic vinyl compound and vinyl cyanide compound can include the aromatic vinyl compound in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the aromatic vinyl compound can be in a range from about any of the foregoing amounts to about any other of the foregoing amounts.

In some embodiments, the copolymer of aromatic vinyl compound and vinyl cyanide compound can include the vinyl cyanide compound in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the vinyl cyanide compound can be in a range from about any of the foregoing amounts to about any other of the foregoing amounts.

When the copolymer includes the aromatic vinyl compound and vinyl cyanide compound in an amount within the above ranges, it may provide the acrylic-based resin composition with excellent coloring property, impact resistance, and weather resistance.

The acrylic-based resin composition may include the vinyl-based copolymer in an amount of about 40 to about 80 wt %, for example about 45 to about 75 wt %, based on the total weight of the first acrylic-based copolymer (A), the second acrylic-based copolymer (B), and the vinyl-based copolymer (C).

In some embodiments, the acrylic-based resin composition can include the vinyl-based copolymer in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments of the present invention, the amount of the vinyl-based copolymer can be in a range from about any of the foregoing amounts to about any other of the foregoing amounts.

When the vinyl-based copolymer is included in an amount within the above range, it may provide an excellent balance of physical properties, coloring property, impact resistance, weather resistance, and high glossy.

(D) Ultraviolet (UV) Stabilizer

The weather resistance of acrylic-based resin composition may be improved by adding the ultraviolet (UV) stabilizer.

The ultraviolet (UV) stabilizer may include a hindered amine-based compound.

Examples of the hindered amine-based compound may include without limitation bis (2,2,6,6-tetramethyl-4-piperidyl)sebacate, tetrakis (2,2,6,6-tetramethyl-4-piperidyl)-1,2,3,4-butanetetracarboxylate, 2,4-dichloro-6-(1,1,3,3-tetramethylbutylamino)-1,3,5-triazine, N,N'-bis(2,2,6,6-tetramethyl-4-piperidyl)hexamethylenediamine, a polycondensate thereof, and the like. These may be used singularly or as a mixture of two or more.

The hindered amine-based compound may have a weight average molecular weight of about 200 to about 2,000 g/mol and a melting point of about 60 to about 200° C. When it has a weight average molecular weight and a melting point within the above ranges, it may provide excellent weather resistance.

The acrylic-based resin composition may include the ultraviolet (UV) stabilizer in an amount of about 0.1 to about 1.2 parts by weight, for example about 0.2 to about 1.0 parts by weight, based on 100 parts by weight of the first acrylic-based copolymer (A), the second acrylic-based copolymer (B), and the vinyl-based copolymer (C).

In some embodiments, the acrylic-based resin composition can include the ultraviolet (UV) stabilizer in an amount of about 0.1, 0.2, 0.3, 0.4, 0.5, 0.6, 0.7, 0.8, 0.9, 1.0, 1.1, or 1.2 parts by weight. Further, according to some embodiments of the present invention, the amount of the ultraviolet (UV) stabilizer can be in a range from about any of the foregoing amounts to about any other of the foregoing amounts.

When the ultraviolet (UV) stabilizer is included in an amount within the above range, it may provide excellent weather resistance and minimize or prevent fault formation such as that resulting from gas generation or the like.

(E) UV Absorber

The weather resistance of acrylic-based resin composition may be improved by adding the UV absorber.

The UV absorber may include a benzotriazole-based compound.

Exemplary benzotriazole-based compounds may include without limitation 2-(2-hydroxy-5-methylphenyl)-2H-benzotriazole, hydroxy-3,5-di (1,1-dimethylbenzyl)phenyl-2H-benzotriazole, phenol-2-(5-chloro-2H-benzotriazole)-4,6-bis(1,1-dimethylethyl), phenol-1,2-(2H-benzotriazol-2-yl)-4-methyl-6-dodecyl, and the like. These may be used singularly or as a mixture of two or more.

The benzotriazole-based compound may have a weight average molecular weight of about 200 to about 1,000 g/mol and a melting point of about 80 to about 200° C. When it has a weight average molecular weight and a melting point within the above ranges, it may provide excellent weather resistance.

The acrylic-based resin composition may include the UV absorber in an amount of about 0.1 to about 1.2 parts by weight, for example about 0.2 to about 1.0 parts by weight, based on 100 parts by weight of the first acrylic-based copolymer (A), the second acrylic-based copolymer (B), and the vinyl-based copolymer (C).

In some embodiments, the acrylic-based resin composition can include the UV absorber in an amount of about 0.1, 0.2, 0.3, 0.4, 0.5, 0.6, 0.7, 0.8, 0.9, 1.0, 1.1, or 1.2 parts by weight. Further, according to some embodiments of the present invention, the amount of the UV absorber can be in a range from about any of the foregoing amounts to about any other of the foregoing amounts.

When the UV absorber is included in an amount within the above range, it may provide excellent weather resistance and minimize or prevent fault formation such as that resulting from gas generation or the like.

The ultraviolet (UV) stabilizer (D) and the UV absorber (E) may be mixed in a weight ratio of about 1:9 to about 9:1, for example a weight ratio of about 2:8 to about 8:2.

In some embodiments, the ultraviolet (UV) stabilizer (D) and the UV absorber (E) can include the ultraviolet (UV) stabilizer in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the ultraviolet (UV) stabilizer can be in a range from about any of the foregoing amounts to about any other of the foregoing amounts.

In some embodiments, the ultraviolet (UV) stabilizer (D) and the UV absorber (E) can include the UV absorber in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the UV absorber can be in a range from about any of the foregoing amounts to about any other of the foregoing amounts.

When the ultraviolet (UV) stabilizer (D) and the UV absorber (E) are mixed in an amount with the above weight ratio range, the effects on blocking light source by the UV absorber and the effects on capturing radicals by the ultraviolet (UV) stabilizer can create a synergistic effect to provide excellent thermal stability and weather resistance.

(F) Other Additive(s)

The acrylic-based resin composition may further include an additive such as but not limited to an antibacterial agent, a heat stabilizer, an antioxidant, a release agent, light stabilizer, surfactant, a coupling agent, a plasticizer, an admixture, a colorant, a stabilizer, a lubricant, an antistatic agent, a coloring aid, a flame proofing agent, an ultraviolet (UV) blocking agent, a nucleating agent, an adhesion aid, an adhesive, and the like, and combinations thereof.

Exemplary antioxidants may include without limitation phenol antioxidants, phosphite antioxidants, thioether antioxidants, amine antioxidants, and the like, and combinations thereof.

Exemplary release agents may include without limitation polymers including fluorine, silicon oils, stearylic metal salts, montanic metal salts, montanic ester waxes, polyethylene waxes, and the like, and combinations thereof.

Exemplary colorants may include without limitation dyes, pigments, and the like, and combinations thereof.

Exemplary ultraviolet (UV) blocking agents may include without limitation titanium dioxide ($TiO_2$), carbon black, and the like, and combinations thereof.

Exemplary nucleating agents may include without limitation talc, clay, and the like, and combinations thereof.

The additive may be included in a predetermined amount as long as it does not deteriorate the properties of the acrylic-based resin composition. In exemplary embodiments, the additive may be included in an amount of about 40 parts by weight or less, for example about 0.1 to about 30 parts by weight based on 100 parts by weight of the first acrylic-based copolymer (A), the second acrylic-based copolymer (B), and the vinyl-based copolymer (C).

The acrylic-based resin composition may be prepared according to known methods of preparing a resin composition. For example, exemplary components according to one embodiment and optionally one or more other additives may be simultaneously mixed and melt-extruded in an extruder to provide a pellet.

According to another embodiment, a molded product is provided that is molded using the acrylic-based resin composition. The molded product may be fabricated using the acrylic-based resin composition according to various processes known in the art such as but not limited to injection molding, blow molding, extrusion molding, thermoforming and the like.

The acrylic-based resin composition may be used to prepare molded products requiring coloring properties, impact resistance, and weather resistance, for example plastic exterior products such as electro-electronic parts, automobile parts and the like.

Hereinafter, the embodiments are illustrated in more detail with reference to examples. However, the following are exemplary embodiments and are not limiting.

EXAMPLES

An acrylic-based resin composition according to one embodiment includes each component as follows.

(A) First Acryl-Based Copolymer 50 parts by weight of rubber including an inner layer including a copolymer of butylacrylate and styrene and an outer layer including a butylacrylate rubber is emulsion-polymerized to be grafted with 50 parts by weight of a mixture including 33 wt % of acrylonitrile and 67 wt % of styrene, so as to provide an acrylonitrile-styrene-butylacrylate graft copolymer. The rubber has an average particle diameter of about 0.16 µm.

(B) Second Acryl-Based Copolymer 60 parts by weight of rubber including an inner layer including polymethylmethacrylate and an outer layer including a butylacrylate rubber is emulsion-polymerized to be grafted with 40 parts by weight of mixture including 33 wt % of acrylonitrile and 67 wt % of styrene, so as to provide an acrylonitrile-styrene-butylacrylate graft copolymer. The rubber has an average particle diameter of about 0.38 µm.

(C) Vinyl-Based Copolymer

A copolymer (SAN) including 32 wt % of acrylonitrile and 68 wt % of styrene is used. The copolymer has a weight average molecular weight of about 120,000 g/mol.

(D) Ultraviolet (UV) Stabilizer

A hindered amine-based compound Tinuvin 770DF, manufactured by Ciba, having a weight average molecular weight of about 480 g/mol and a melting point of 81 to 85° C., is used.

(E) UV Absorber

A benzotriazole-based compound Tinuvin 327, manufactured by Ciba, having a weight average molecular weight of about 360 g/mol and a melting point of 154 to 158° C., is used.

Examples 1 to 4 and Comparative Examples 1 to 4

Each acrylic-based resin composition of Examples 1 to 4 and

Comparative Examples 1 to 4 is prepared using the components shown in the following Table 1.

The manufacturing method includes mixing each component as shown in the following Table 1; adding 0.1 part by weight of lubricant (CHOYANG HWASUNG CO., LTD., HILUB B-50), 0.02 parts by weight of impact-reinforcing agent (Shinetsu, KF-96-100CS), and 0.5 parts by weight of carbon black (Evonik, Highblack 50L); and melting and kneaded-extruding the same to provide a pellet. The compositions are extruded using a twin-screw extruder having L/D=29, and a diameter of 45 mm at a barrel temperature of 220° C.

The part by weight unit of the lubricant, the impact-reinforcing agent, and the carbonblack is based on 100 parts by weight of (A) the first acrylic-based copolymer, (B) the second acrylic-based copolymer, and (C) vinyl-based copolymer.

Experimental Example

The each obtained pellet is dried at 80° C. for 2 hours and injection-molded using an injection molding machine having injection performance of 6 oz by setting a cylinder temperature at 210° C. and a mold temperature at 60° C. to provide a ASTM dumb-bell specimen for evaluating physical properties. The physical properties of the obtained specimens are measured according to the following methods, and the results are shown in the following Table 1.

1) IZOD Impact strength: measured according to ASTM D256 (specimen thickness of ⅛").

2) Weather resistance: Color difference before testing a M9 cm×5 cm×0.2 cm specimen for weather resistance and after testing the same for weather resistance for 3,000 hours using a ATLAS Ci5000 WOM device according to the SAE J 1960 condition is measured using a Minolta CM-3600D color-difference meter.

3) Glossy: measured at an angle of 60° using a UGA UGV-6P DIGITAL VARIABLE GLOSS METER.

4) Coloring property: Brightness of black color is measured under a D65 light source using a Minolta CM-3600D color-difference meter.

TABLE 1

|  | Examples | | | | Comparative Examples | | | |
| --- | --- | --- | --- | --- | --- | --- | --- | --- |
|  | 1 | 2 | 3 | 4 | 1 | 2 | 3 | 4 |
| (A) first acrylic-based copolymer (wt %) | 25 | 19 | 13 | 25 | 43 | — | 25 | 25 |
| (B) second acrylic-based copolymer (wt %) | 15 | 20 | 25 | 15 | — | 36 | 15 | 15 |
| (C) vinyl-based copolymer (wt %) | 60 | 61 | 62 | 60 | 57 | 64 | 60 | 60 |
| (D) ultraviolet (UV) stabilizer (parts by weight*) | 0.5 | 0.5 | 0.5 | 0.3 | 0.5 | 0.5 | 0.6 | — |
| (E) UV absorber (parts by weight*) | 0.5 | 0.5 | 0.5 | 0.3 | 0.5 | 0.5 | — | — |
| Impact strength (kgf · cm/cm) | 20 | 23 | 26 | 20 | 13 | 30 | 20 | 20 |
| Weather resistance (ΔE) | 2.6 | 2.6 | 2.5 | 2.9 | 2.8 | 2.6 | 3.6 | 4.9 |
| Gloss (%) | 92 | 91 | 90 | 92 | 94 | 87 | 92 | 92 |
| Coloring property (L*) | 28.2 | 28.4 | 28.6 | 28.2 | 27.8 | 29.4 | 28.2 | 28.1 |

*parts by weight: amount unit based on 100 parts by weight of (A) the first acrylic-based copolymer, (B) the second acrylic-based copolymer, and (C) vinyl-based copolymer.

As shown in Table 1, Examples 1 to 4 including (A) a first acrylic-based copolymer having a core-shell structure including a rubber having an average particle diameter of about 0.1 to about 0.30 μm, (B) a second acrylic-based copolymer having a core-shell structure including a rubber having an average particle diameter of about 0.35 to about 0.6 μm, (C) a vinyl-based copolymer, (D) an ultraviolet (UV) stabilizer, and (E) an UV absorber have an excellent balance of physical properties including impact resistance, weather resistance, and coloring property as compared to Comparative Examples 1 to 4 which did not include one of the first acrylic-based copolymer or the second acrylic-based copolymer nor did not include the ultraviolet (UV) stabilizer and/or the UV absorber.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is
1. An acrylic-based resin composition comprising:
(A) a first acrylic-based copolymer having a core-shell structure comprising a rubber including an acrylic-based compound and having an average particle diameter of about 0.1 to about 0.30 μm, wherein the rubber included in the first acrylic-based copolymer (A) has a bilayer structure comprising an inner layer of a copolymer of an acrylic-based compound and an aromatic vinyl compound and an outer layer of an acrylic-based compound;
(B) a second acrylic-based copolymer having a core-shell structure comprising a rubber including an acrylic-based compound and having an average particle diameter of about 0.35 to about 0.6 μm, wherein the rubber included in the second acrylic-based copolymer (B) has a bilayer structure comprising an inner layer of a polyalkyl(meth)acrylate and an outer layer of an acrylic-based compound;
(C) a vinyl-based copolymer;
(D) an ultraviolet (UV) stabilizer; and
(E) an UV absorber.

2. The acrylic-based resin composition of claim 1, wherein the acryl-based resin composition comprises
about 4 to about 48 wt % of the first acrylic-based copolymer (A);
about 4 to about 48 wt % of the second acrylic-based copolymer (B);
about 40 to about 80 wt % of the vinyl-based copolymer (C);
about 0.1 to about 1.2 parts by weight of the ultraviolet (UV) stabilizer (D) based on 100 parts by weight of the first acrylic-based copolymer (A), the second acrylic-based copolymer (B), and the vinyl-based copolymer (C); and
about 0.1 to about 1.2 parts by weight of the UV absorber (E) based on 100 parts by weight of the first acrylic-based copolymer (A), the second acrylic-based copolymer (B), and the vinyl-based copolymer (C).

3. The acrylic-based resin composition of claim 1, comprising the first acrylic-based copolymer (A) and the second acrylic-based copolymer (B) in a weight ratio of about 2:8 to about 8:2.

4. The acrylic-based resin composition of claim 1, wherein the vinyl-based copolymer (C) comprises a copolymer of an aromatic vinyl compound and a vinyl cyanide compound.

5. The acrylic-based resin composition of claim 1, wherein the ultraviolet (UV) stabilizer (D) comprises a hindered amine-based compound.

6. The acrylic-based resin composition of claim 1, wherein the ultraviolet (UV) stabilizer (D) comprises bis (2,2,6,6-tetramethyl-4-piperidyl)sebacate, tetrakis (2,2,6,6-tetramethyl-4-piperidyl)-1,2,3,4-butanetetracarboxylate, 2,4-dichloro-6-(1,1,3,3-tetramethylbutylamino)-1,3,5-triazine, and N,N'-bis (2,2,6,6-tetramethyl-4-piperidyl)hexamethylenediamine, a polycondensate thereof, or a combination thereof.

7. The acrylic-based resin composition of claim 1, wherein the UV absorber (E) comprises a benzotriazole-based compound.

8. The acrylic-based resin composition of claim 1, wherein the UV absorber (E) comprises 2-(2-hydroxy-5-methylphenyl)-2H-benzotriazole, hydroxy-3,5-di(1,1-dimethylbenzyl)phenyl-2H-benzotriazole, phenol-2-(5-chloro-2H-benzotriazole)-4,6-bis(1,1-dimethylethyl), phenol-1,2-(2H-benzotriazol-2-yl)-4-methyl-6-dodecyl, or a combination thereof.

9. The acrylic-based resin composition of claim 1, comprising the ultraviolet (UV) stabilizer (D) and the UV absorber (E) in a weight ratio of about 1:9 to about 9:1.

10. A molded product made of the acrylic-based resin composition of claim 1.

* * * * *